(12) United States Patent
Allegra et al.

(10) Patent No.: US 11,482,066 B2
(45) Date of Patent: Oct. 25, 2022

(54) BULK PRODUCT DISPENSER

(71) Applicant: Franke Foodservice Systems, Inc., Smyrna, TN (US)

(72) Inventors: Mark E. Allegra, Brentwood, TN (US); Khalil Chmayssani, Nolensville, TN (US); Ireneusz Czapp, Reda (PL); Tomasz Robaszkiewicz, Rumia (PL); Marek Ormanin, Suchy Dwor (PL); Brian Phillips, Smyrna, TN (US)

(73) Assignee: FRANKE FOODSERVICE SYSTEMS, INC., Smyrna, TN (US)

( * ) Notice: Subject to any disclaimer, the term of this patent is extended or adjusted under 35 U.S.C. 154(b) by 0 days.

(21) Appl. No.: 16/361,607

(22) Filed: Mar. 22, 2019

(65) Prior Publication Data

US 2019/0311568 A1    Oct. 10, 2019

Related U.S. Application Data

(60) Provisional application No. 62/646,529, filed on Mar. 22, 2018.

(51) Int. Cl.
*G07F 11/24* (2006.01)
*A47F 1/035* (2006.01)
(Continued)

(52) U.S. Cl.
CPC .............. *G07F 11/24* (2013.01); *A47F 1/035* (2013.01); *G07F 11/44* (2013.01); *G07F 11/48* (2013.01);
(Continued)

(58) Field of Classification Search
CPC ...... G07F 11/24; G07F 17/0078; G07F 11/52; G07F 11/50; G07F 11/48; G07F 11/44; G07F 17/0064; A47F 1/035
(Continued)

(56) References Cited

U.S. PATENT DOCUMENTS 2,824,675 A * 2/1958 Pepitone ................... B65B 1/10
                                                    222/368
5,052,288 A    10/1991 Marquez et al.
(Continued)

OTHER PUBLICATIONS

International Search Report and Written Opinion, PCT/US19/023565, Franke Foodservice Systems, Inc. (international filing dated Mar. 22, 2019).

*Primary Examiner* — Jason K Niesz
(74) *Attorney, Agent, or Firm* — Wayne Edward Ramage; Baker Donelson

(57) ABSTRACT

An improved dispenser unit for dispensing bulk food items, including a cabinet having at least one hopper having a drum with product compartments, a deflector and flexible gate valve, a dispense assembly, and a control system. The dispense assembly may or may not include one or more belts and/or sensors. The product compartments include flexible and/or elastic membranes, which dynamically change the effective product storage volume within a compartment, and eliminate rigid or semi-rigid pinch points between the drum and drum compartment. A product flow divider may be positioned above the receiving container in the dispense assembly, said divider configured to cause the dispensed product to divide into two or more flow streams into the receiving container. The receiving container may be vibrated or oscillated.

18 Claims, 15 Drawing Sheets

(51) Int. Cl.
*G07F 11/44* (2006.01)
*G07F 17/00* (2006.01)
*G07F 11/52* (2006.01)
*G07F 11/50* (2006.01)
*G07F 11/48* (2006.01)

(52) U.S. Cl.
CPC .............. *G07F 11/50* (2013.01); *G07F 11/52* (2013.01); *G07F 17/0078* (2013.01); *G07F 17/0064* (2013.01)

(58) Field of Classification Search
USPC .................................. 141/360; 222/367, 368
See application file for complete search history.

(56) References Cited

U.S. PATENT DOCUMENTS

| | | | |
|---|---|---|---|
| 5,132,914 A | | 7/1992 | Cahlander et al. |
| 5,303,672 A | * | 4/1994 | Morris .................. A01K 5/0291 119/51.11 |
| 5,353,847 A | | 10/1994 | Cahlander et al. |
| 8,003,143 B2 | * | 8/2011 | Taylor .................... B65B 25/065 426/231 |
| 2006/0113324 A1 | * | 6/2006 | Rudesill .................. G07F 11/24 222/132 |

* cited by examiner

BULK PRODUCT DISPENSER

This application claims benefit of and priority to U.S. Provisional App. No. 62/646,529, filed Mar. 22, 2018, which is incorporated herein in its entirety by specific reference for all purposes.

FIELD OF INVENTION

This invention relates to an apparatus and method for dispensing of items or products. More particularly, this invention relates to an apparatus and method for automatically dispensing pre-determined portions of bulk food items.

BACKGROUND OF THE INVENTION

In restaurants, especially quick service (fast food and fast casual) restaurants, fast, consistent, efficient and safe food preparation is essential for a successful operation. One important task frequently required in the preparation of fast food is the portioning of bulk food items supplied in bulk food containers. Each container holds a large number of individual food items such as french fries, cheese sticks, chicken nuggets or the like. The use of bulk containers is efficient because it minimizes the number of individual containers which must be transported to, handled and stored at a restaurant. Because it is typically unnecessary, undesirable or impossible to prepare or serve the entire contents of a given container at one time, the bulk food items must be portioned before cooking, heating or serving.

Portioning or holding bulk food product involves many of the efficiency, speed, safety and consistency considerations involved in fast food preparation generally. For example, consistent food preparation requires that portions be of a uniform size because over- or under-sized portions may yield an under- or over-prepared food product when the portion is cooked, heated, served or otherwise processed. Additionally, portioning should be performed quickly to minimize food preparation delays which may dissatisfy customers. Furthermore, portioning operations should be non-labor intensive so as to efficiently utilize restaurant labor, particularly when such workers are in high demand and difficult to procure. Finally, portioning operations should minimize the manual manipulation of food products by restaurant workers, thereby minimizing safety concerns related to food handling generally.

Although quick service restaurants have existed for many years and now number in the tens of thousands, these establishments typically continue to utilize labor intensive, manual processes to portion the contents of containerized bulk food products. While portioning devices and systems are known in the prior art, these devices and systems still often result in damaged or crushed product, or require substantial handling or other manual processes to dispense and deliver the apportioned food products to the cooking or serving apparatus. An example of a prior art apparatus is disclosed in Rudesill, et al., "Multi-Product Dispenser and Method of Using Same," U.S. patent application Ser. No. 11/288,478, filed Nov. 29, 2015, which is incorporated herein by specific reference in its entirety for all purposes.

Accordingly, what is needed is a commercially suitable portioning and delivery apparatus for containerized bulk food items that minimizes manual food handling, requires little operator attention, and quickly, automatically, consistently, and accurately portions bulk food items while minimizing damage and crushing of product, while maximizing quality, efficiency, flexibility and yield of the bulk food items, for serving or further preparation.

SUMMARY OF INVENTION

In various exemplary embodiments, a dispenser unit dispenses bulk food items The dispenser unit may include a cabinet including at least one hopper having a drum, a deflector, a flexible gate valve, a conveyor, a dispense assembly and a control system. The dispenser unit may include the means to hold product at required temperatures such as a self-contained refrigerator or heating system. The dispense assembly may include at least one bottomless bucket, at least one dispensing door assembly, and at least one position for a receiving container to collect a dispensed bulk food item. Additionally, the dispense assembly may include a system to measure portions by weight or product count, employing a load cell, proximity sensor, optical sensor and/or similar device or devices.

In several embodiments, the bulk food item is introduced into a cabinet of the dispenser unit. The deflector then deflects the bulk food items to a top portion of the drum. The bulk items may rest on a contact area of not more than about 90° between the top portion of the drum and the flexible gate valve. The flexible gate valve may be located opposite to and below the deflector and at a downward angle from a sidewall of the at least one hopper with at least a portion of the flexible gate valve in contact with a portion of the drum. The drum then rotates in a direction to transport the bulk food items from the contact area of the drum past the flexible gate valve towards a bottom portion of the hopper, for example in a clockwise direction. Rotation of the drum or movement of conveyor continues in one direction until a predetermined or desired weight or count is satisfied by, for example, the load cell system. The at least one bottomless container stores the bulk food items delivered by the at least one hopper until the sensor detects at least one container in a receiving position at which time the bulk food items may be dispensed.

In several embodiments, the drum comprises a plurality of lobes defining product-transporting compartments or spaces therebetween. The drum rotates within a drum chamber to carry bulk product from the hopper to a dispensing point or receptacle (e.g., container or belt). In a preferred embodiment, the lobes do not extend all the way to the interior walls of the drum chamber, and each compartment includes a flexible and/or elastic membrane that extend between (and in some cases, beyond) the sides or ends of the respective lobes. This arrangement eliminates rigid pinch points for the bulk product as the drum rotates, and allows for expansion of the functional volume of the compartment to eliminate compression or crushing of the bulk product In a further embodiment, the dispenser unit may also include or work with a control panel for automatically and/or manually controlling the dispenser unit. The control panel may be located external to the dispenser unit. The measuring system of the dispenser unit may also be located external to the cabinet on a back portion of the dispenser unit. The measuring system may be calibrated with the initial turning on or initializing of the dispenser unit. Additionally, the cabinet or the dispense assembly may be removable from the dispenser unit to allow for easy and efficient cleaning of the internal and external areas of the dispenser unit.

In yet another embodiment, a method for dispensing bulk food items includes inserting the bulk food items in a dispenser unit having at least one hopper storage area, comprising a drum as described above, a deflector, and a flexible gate valve or the like. The bulk food items are then transported to the bottom area of the at least one hopper storage area. The bulk food items are dropped from the bottom area of the at least one hopper storage area into a dispense assembly including at least one bottomless bucket, at least one dispensing door assembly, a measuring system, a proximity sensor, and at least one receiving container. The bulk food items are then released into the at least one receiving container when the sensor of the dispense assembly detects the at least one receiving container. The method may also include the step of rotating the drum in the at least one storage area in a direction that transports the bulk food items to the bottom area of at least one hopper storage area. The inserted bulk food items may rest on a contact area between a top portion of the drum and the flexible gate valve comprising not more than 90° in area. When the measuring system of the dispense assembly satisfies a predetermined or desired weight or count of bulk food items in the at least one bottomless bucket, the bulk food items may be released into the at least one receiving container when the at least one dispensing door of the dispense assembly is opened. Additionally, the method may include the step of removing the dispenser unit for cleaning purposes. The dispenser unit may be a freezer box with a self-contained refrigeration unit.

In another embodiment, a dispenser unit for dispensing bulk food items includes a refrigerated or heated cabinet, a dispense assembly and a control system. The cabinet may include a self-contained refrigeration or heating system including a first and second hopper each having a drum, a deflector, and a flexible gate valve. The flexible gate valve may be located opposite to and below the deflector, with at least a portion in contact with a portion of the drum. The dispense assembly may include a first and second bottomless bucket, a first and second dispensing door assembly, a conveyor or conveyors and a first and second receiving container for collecting dispensed bulk food items. The dispense assembly may also include a measuring system and a proximity sensor. The bulk food items may be inserted in the first and second hopper with the bulk food items making contact with the deflector in an area of no more than 90° between a top portion of the drum and the flexible gate valve. The drum may rotate in one direction to transport the bulk food items past the flexible gate valve until a predetermined weight is satisfied by the measuring system which then communicates with the drum. The drum then stops rotating and the bulk food is prevented from traveling past the flexible gate valve. The bulk food items are allowed to then fall into the first and second bottomless buckets, conveyor or conveyors, or the like, respectively. The first dispensing door assembly then opens to dispense the bulk food items when the proximity sensor detects the first receiving container. The cabinet and/or the dispense assembly may be removable to allow for cleaning of the dispenser unit.

In several embodiments, a divided container is used to keep the product separated to prevent sticking and improve cooking of the product. A dividing rod may be positioned below the dispensing position of the drum to cause the falling product to more evenly divide into right and left streams. This more evenly distributes the falling product into the divided parts of the container, and prevents the product from piling up in the middle. It should be noted that containers can be divided into multiple sections, and more than one dividing rod or similar element can be used to ensure proper apportionment of the bulk product.

In yet a further embodiment, the container is subject to a vibration or oscillating movement to cause the container to vibrate or oscillate to cause the product to fall into the spaces between the dividers and allow the product to settle. The vibration or oscillation feature can be achieved by a variety of means. For example, the platform on which the container sits in the dispensing position may vibrate or oscillate.

DETAILED DESCRIPTION OF EXEMPLARY EMBODIMENTS

Figure 1:
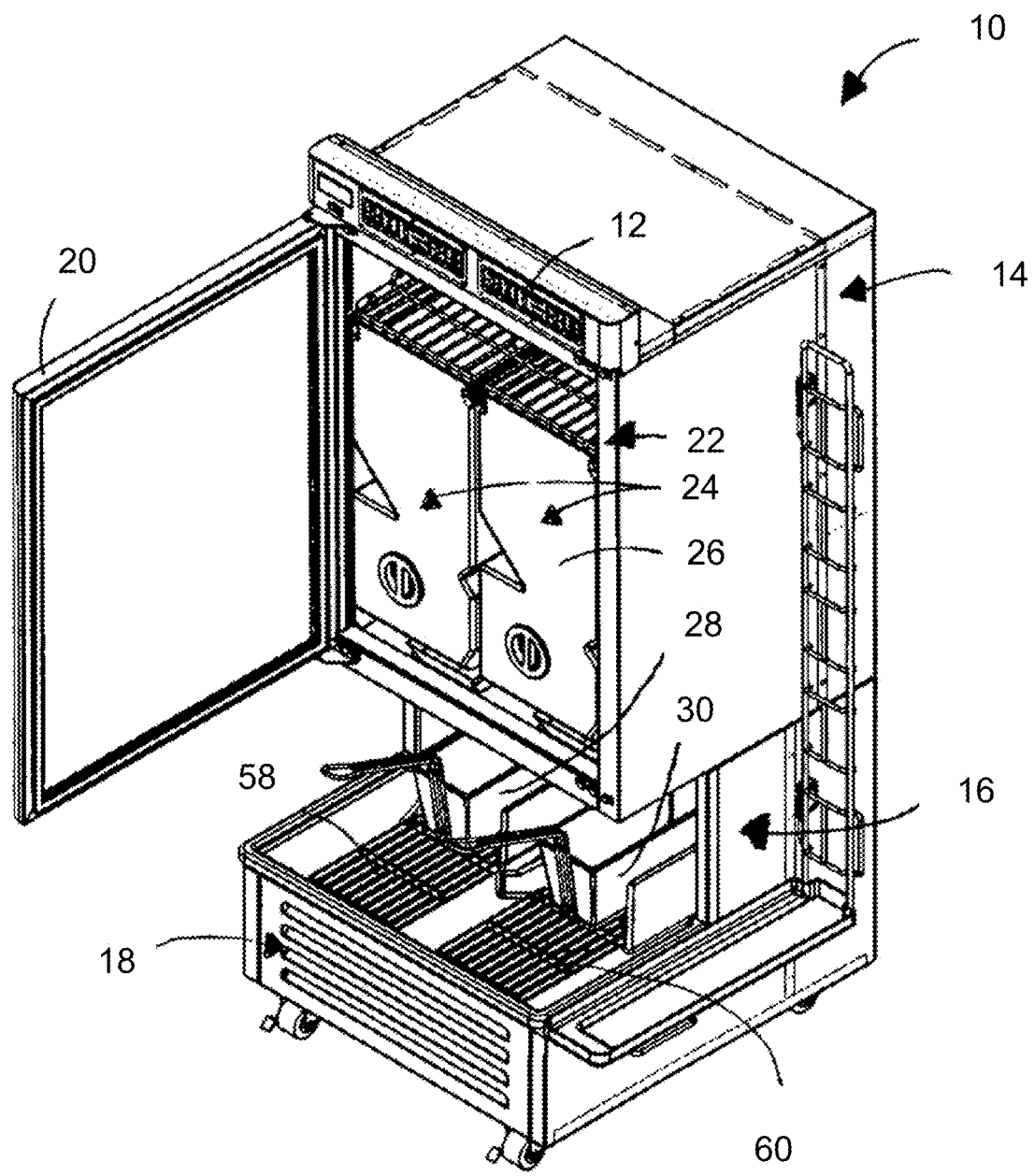
FIG. 1 shows a view of a prior art dispenser system.

In the following description and accompanying drawings, like reference numbers, as used in the various figures, refer to like features or elements. For purposes of the description hereinafter, the terms "upper," "lower," "right," "left," "vertical," "horizontal," "top," "bottom," and derivatives thereof shall relate to the invention, as it is oriented in the drawing figures. However, it is to be understood that the invention may assume various alternative variations and step sequences that the specific devices and process illustrated in the attached drawings and described in the following text are simply exemplary embodiments of the invention. Hence, specific dimensions and other physical characteristics related to the embodiments disclosed hereinafter are not to be considered limiting.

While embodiments are discussed herein in terms of dispensing french fries, the product may be any dispensable item, including for example, food such as patties or nuggets or a vegetable or protein food item other than french fries, any of which might require portioning to a predetermined weight or count and dispensing them on demand into a receptacle prior to, or after, cooking, heating or other processing.

FIG. 1 shows an example of a prior art dispensing apparatus, as disclosed in Rudesill, U.S. patent application Ser. No. 11/288,478. The dispenser unit 10 includes a control panel 12, a cabinet 14, a dispense assembly 16 and a self-contained refrigerator system 18. Cabinet 14 having cabinet door 20 provides access to a drum/hopper storage area 22. Hopper storage area 22 supports a first hopper 24 and an optional second hopper 26. Hoppers 24 and 26 are located adjacent to each other. Hopper storage area 22 may also support an additional number of hoppers. Hoppers 24 and 26 are designed to receive a plurality or bulk amount of food or bulk product, such as french fries. The french fries in hoppers 24 and 26 are portioned to a predetermined weight (typically through some form of gating mechanism, such as a rotating metering drum) and dispensed into one or more fry receiving containers 28 and 30, respectively. Proximity sensors detect the presence of the fry receiving containers, which are manually placed in the respective dispense lane guides 58, 60, causing dispensing doors to open and drop fries into the container. Fry containers are then manually removed and lowered into a fry vat for cooking.

Each hopper 24 may have a top side, bottom side having a feeder opening, first sidewall and second sidewall. Each hopper 24 may also have front and rear walls between the sidewalls. The walls of the hoppers, including the front wall (not shown) may be opaque, or optionally, partially or fully transparent or semi-transparent to allow for visual observation of the contents of the hoppers. The hoppers may also include a low level sensor which indicates that the contents of the hopper may be below a designated amount and refilling is necessary.

In several embodiments, each hopper includes an inlet area, a deflector, a drum, and a flap portion or flexible gate valve. The bulk food may be introduced into hopper 24 through the top side, the inlet area, or any associated area located above deflector. Deflector extends from first sidewall at a downward angle to allow the food to be fed towards the drum, to a top area of the drum at approximately the twelve o'clock position on the drum. However, deflector may deliver product to other areas, such as approximately an eleven o'clock position or approximately a one o'clock position.

FIGS. 2-5 show an improved dispensing unit in accordance with an exemplary embodiment of the present invention. The dispenser unit may include a cabinet including at least one hopper having a drum, a deflector, a flexible gate valve, a conveyor, a dispense assembly and a control system (the control system may or may not be integrated with or connected to another computer system). The dispenser unit may include the means to hold product at required temperatures such as a self-contained refrigerator or heating system. The dispense assembly may include at least one bottomless bucket, at least one dispensing door assembly, and at least one position for a receiving container to collect a dispensed bulk food item. Additionally, the dispense assembly may include a system to measure portions by weight or product count, employing a load cell, proximity sensor, optical sensor and/or similar device or devices.

The dispenser unit 110 includes a control panel 112 located on a door 114 of a housing 116. Controls can be located elsewhere in a multitude of locations, in view or not in view of the user. The dispenser unit 110 is shown as a table top or wall-mounted configuration, but can also be built into a cabinet, table or stand, and can be stationary or mobile. The measuring system of the dispenser unit may also be located external to the cabinet on a back portion of the dispenser unit. The measuring system may be calibrated with the initial turning on or initializing of the dispenser unit. Additionally, the cabinet or the dispense assembly may be removable from the dispenser unit to allow for easy and efficient cleaning of the internal and external areas of the dispenser unit.

Figure 2:
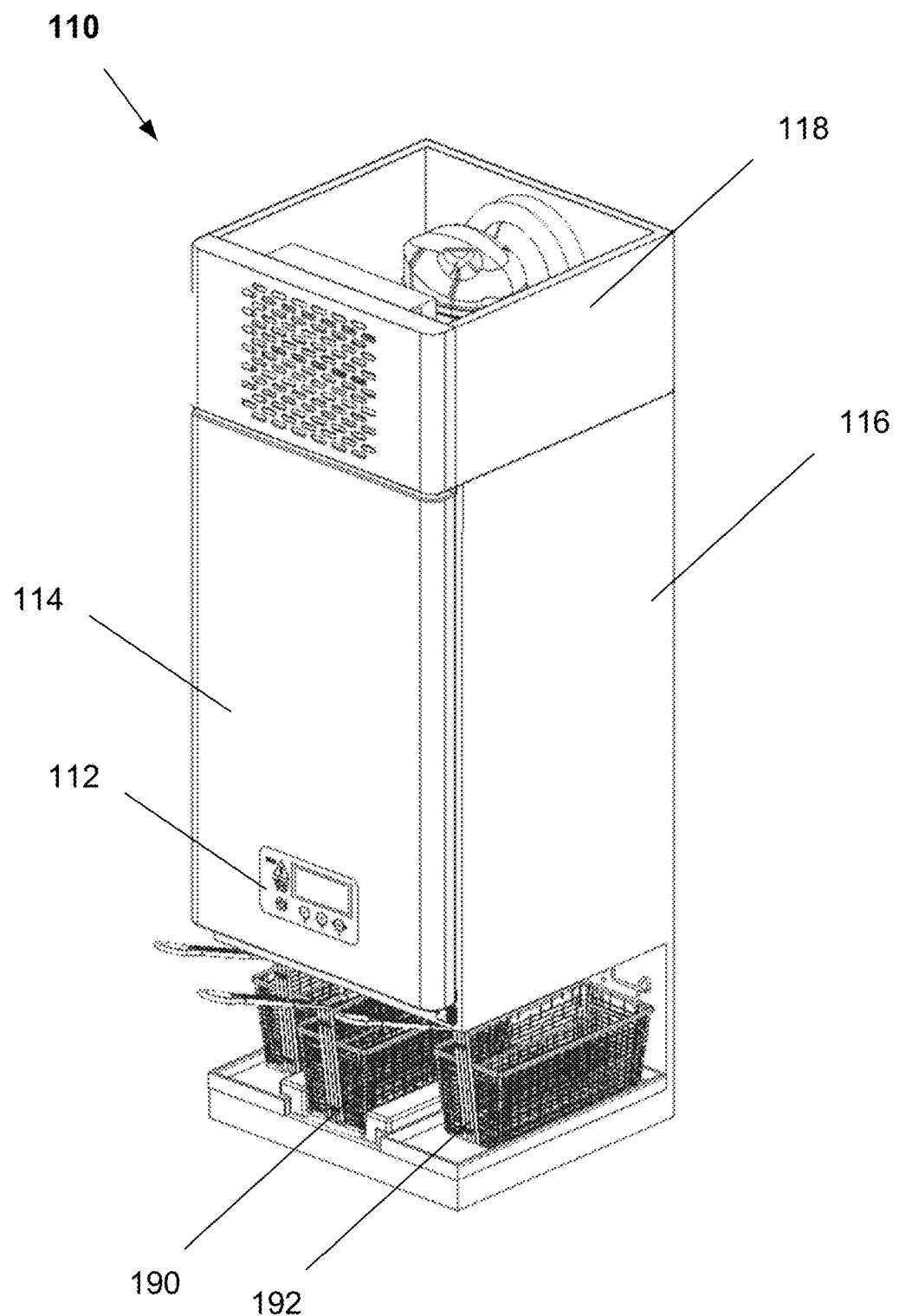
FIGS. 2-3 show perspective views of an improved dispensing unit.

The unit 110 may be refrigerated, heated or operate in an ambient state/room temperature. The unit in FIG. 2 is shown in or as part of a refrigerator or freezer, but also could be placed in an insulated or heated cabinet without a refrigeration system (e.g., large cooler). While a refrigeration system 118 is shown on top of the unit in FIG. 2, a refrigeration or heating system could also be located on the rear, bottom, side, or even remotely from the unit.

Figure 3:
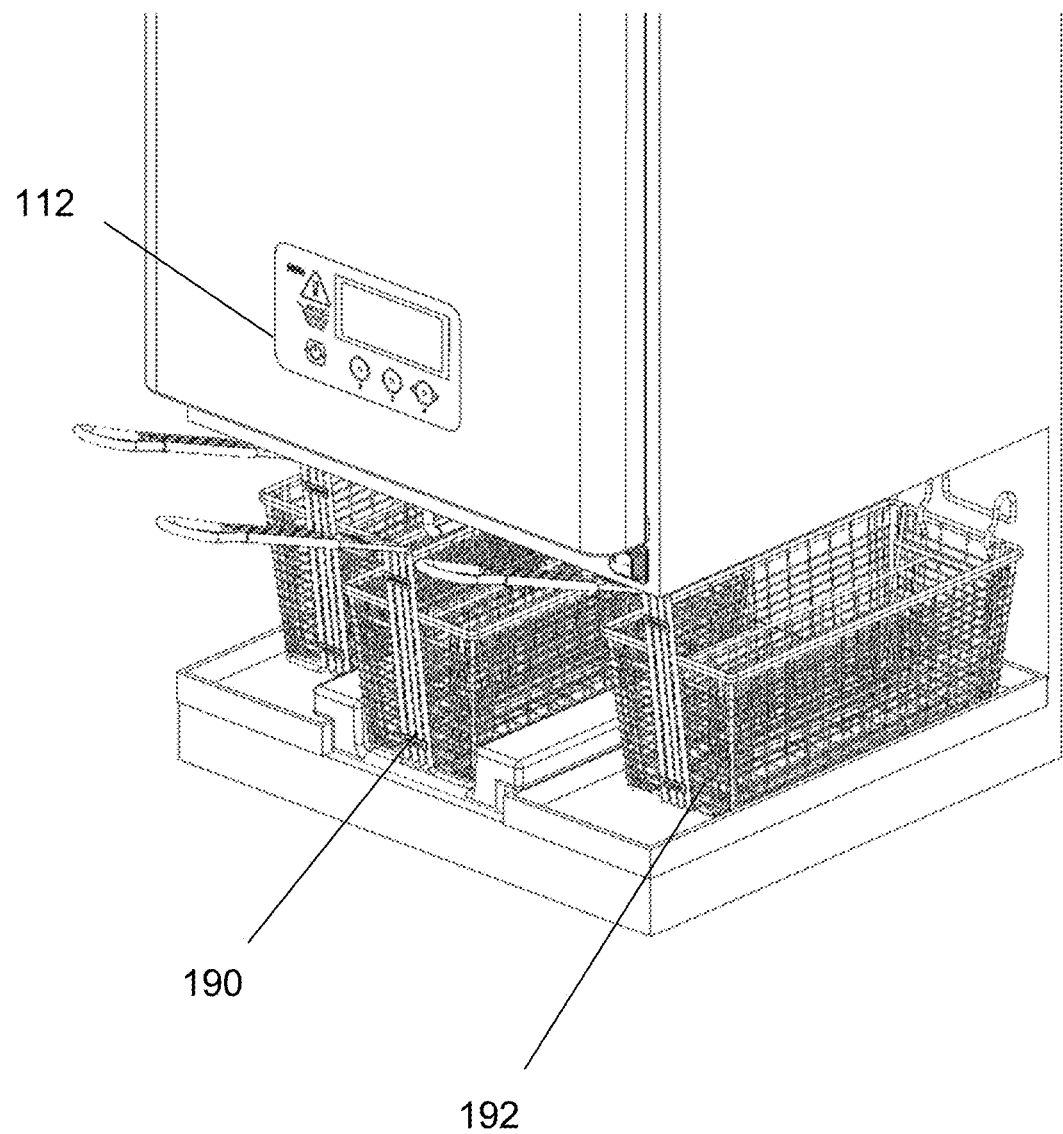

The dispenser unit may include the means to hold product at required temperatures such as a self-contained refrigerator or heating system. The dispense assembly may include at least one bottomless bucket, at least one dispensing door assembly, and at least one position for a receiving container to collect a dispensed bulk food item. Additionally, the dispense assembly may include a system to measure portions by weight or product count, employing a load cell, proximity sensor, optical sensor and/or similar device or devices. The lower part of the unit comprises an area for placement of containers 190, which may include, but are not limited to, baskets (with single or multiple compartments). FIGS. 2 and 3 show a central area for a container 190 to be loaded with bulk product, with two adjacent areas for storage of containers 192.

Figure 4:
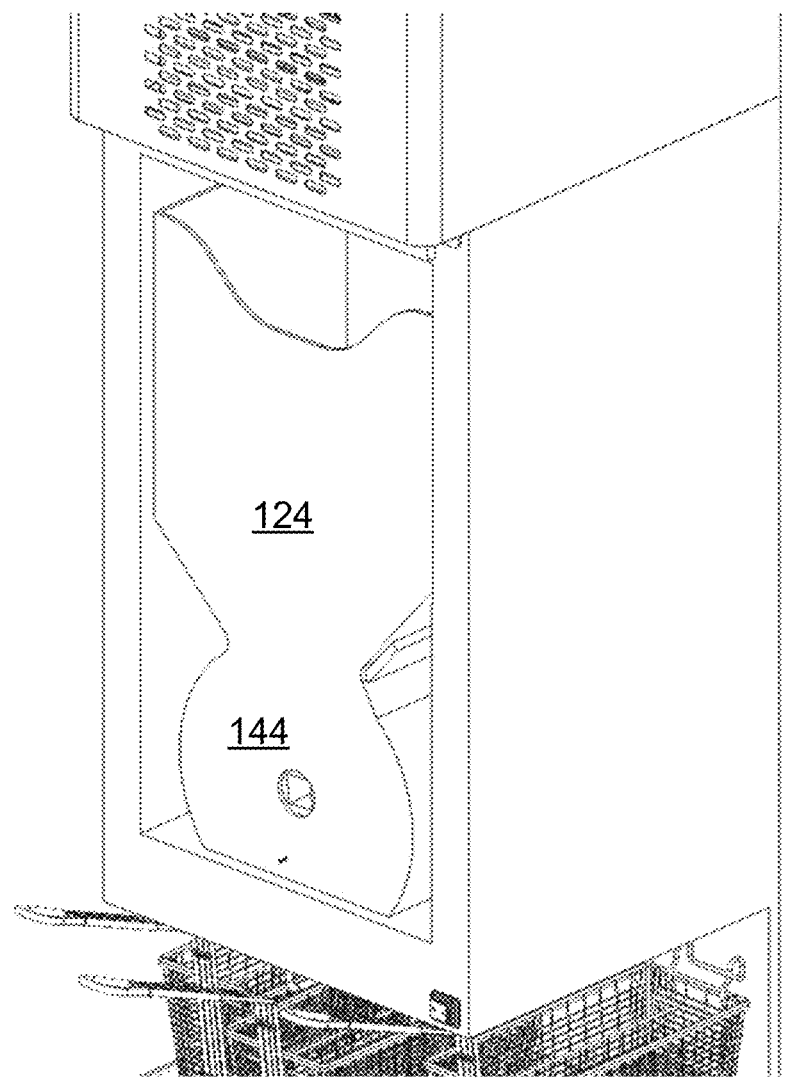
FIG. 4 shows a perspective view of a hopper in the improved dispensing unit of FIG. 2.

The unit 110 in FIG. 4 is shown with a single hopper 124 with a single centrally positioned rotating drum 144, but as discussed above, multiple hoppers and drums may be used, and the drums may be alternatively positioned. In several embodiments, the bulk food item is introduced into a cabinet of the dispenser unit. The deflector then deflects the bulk food items to a top portion of the drum. The bulk items may rest on a contact area of not more than about 90° between the top portion of the drum and the flexible gate valve. The flexible gate valve may be located opposite to and below the deflector and at a downward angle from a sidewall of the at least one hopper with at least a portion of the flexible gate valve in contact with a portion of the drum. The drum then rotates in a direction to transport the bulk food items from the contact area of the drum past the flexible gate valve towards a bottom portion of the hopper, for example in a clockwise direction. Rotation of the drum or movement of conveyor continues in one direction until a predetermined or desired weight or count is satisfied by, for example, the load cell system. The at least one bottomless container stores the bulk food items delivered by the at least one hopper until the sensor detects at least one container in a receiving position at which time the bulk food items may be dispensed.

Figure 5:
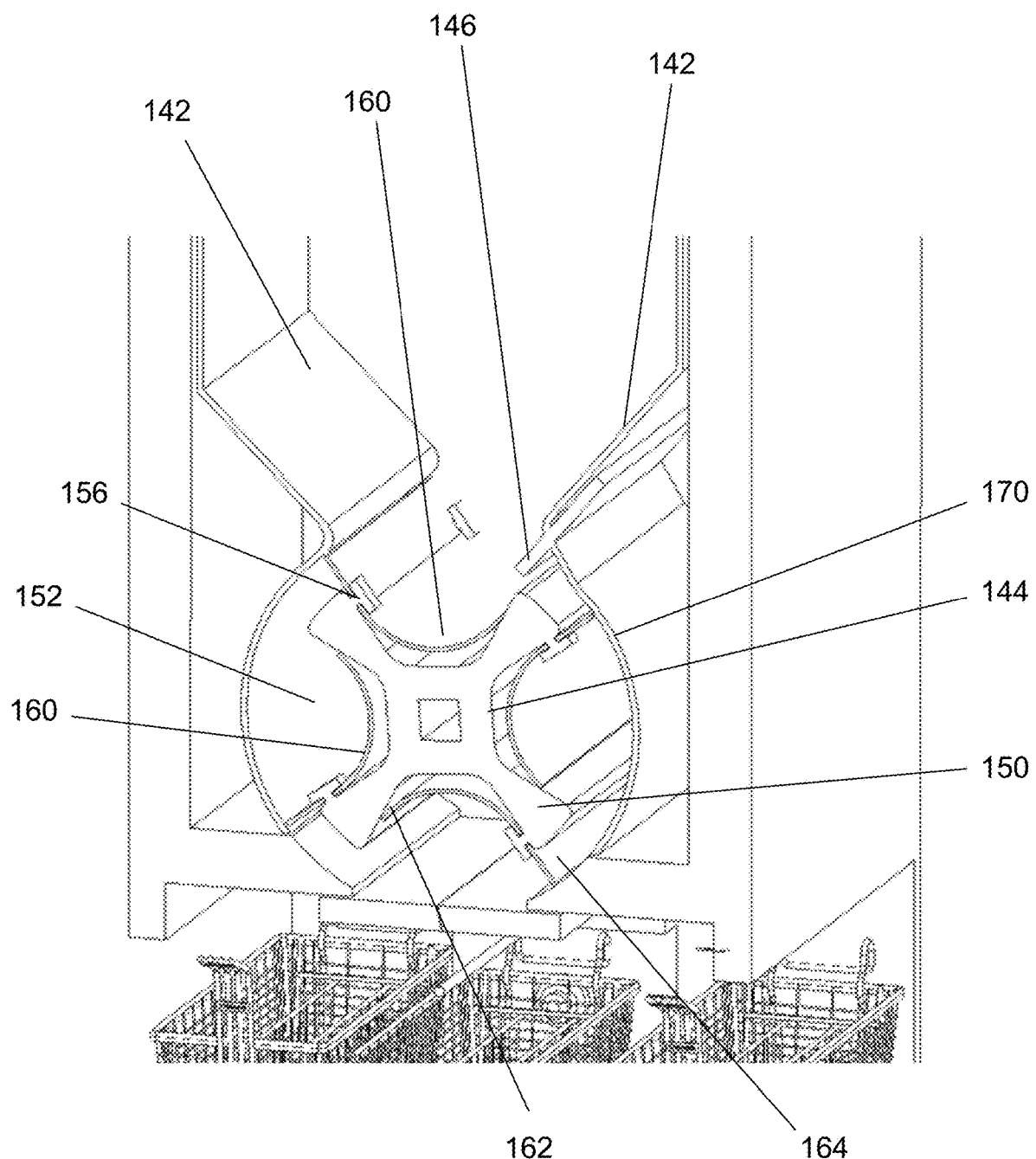
FIG. 5 shows a cutaway perspective of the improved rotating drum of the improved dispensing unit.
Figure 6:
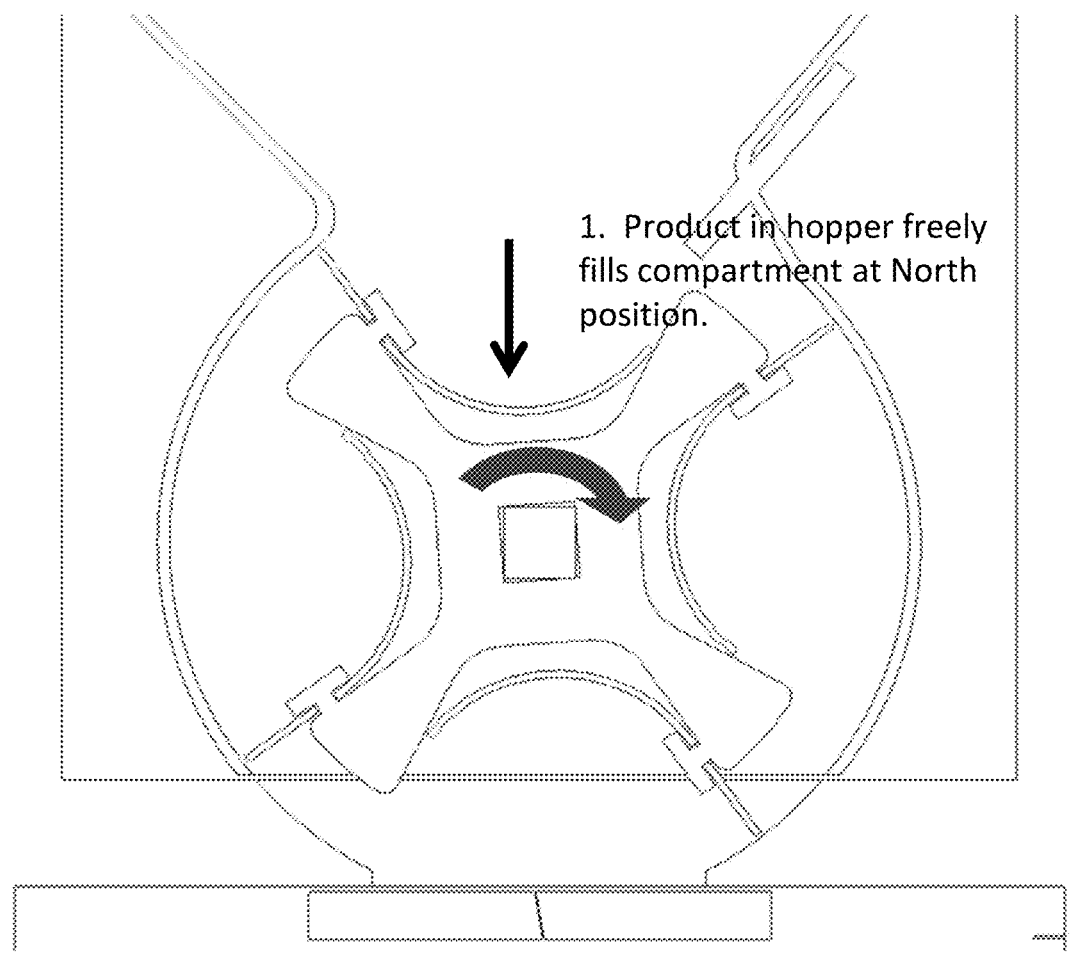
FIGS. 6-11 show cutaway side views of operation of the rotating drum of FIG. 5.
Figure 7:
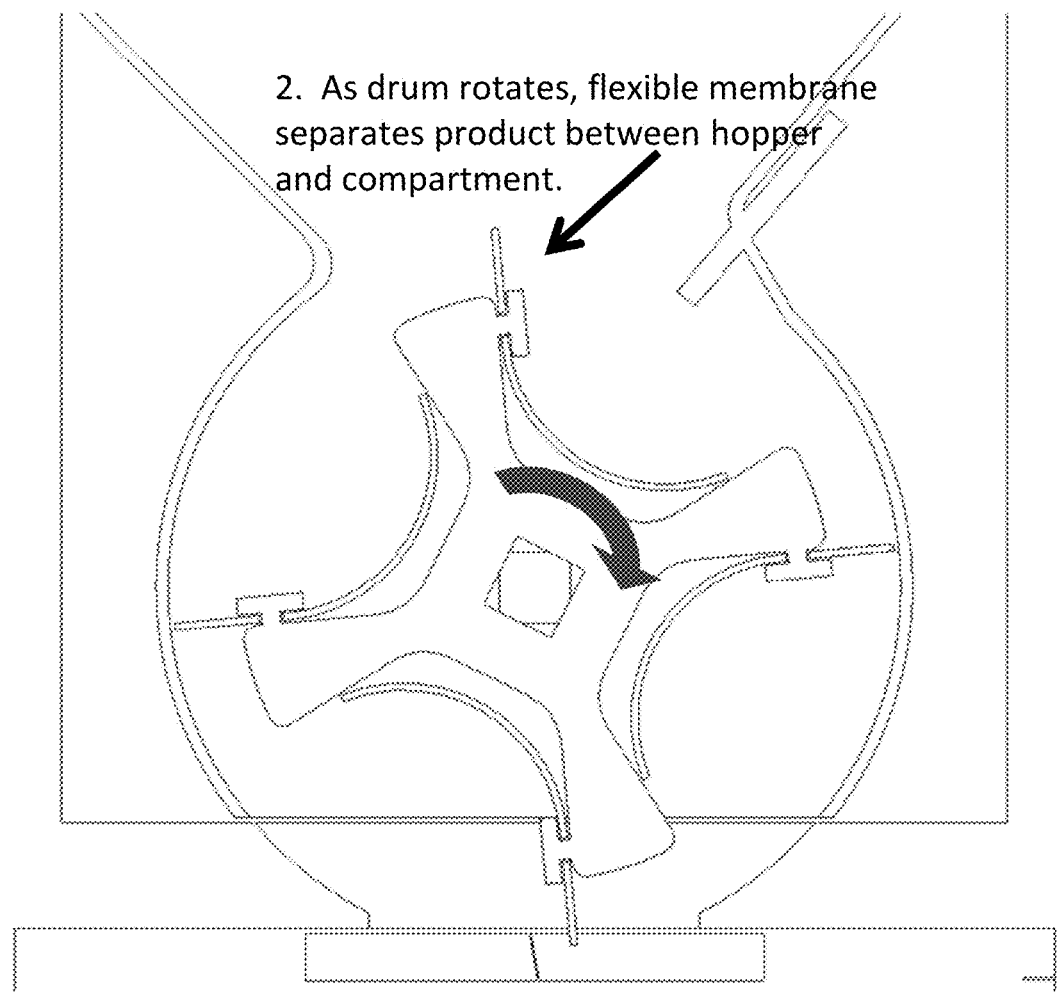
Figure 8:
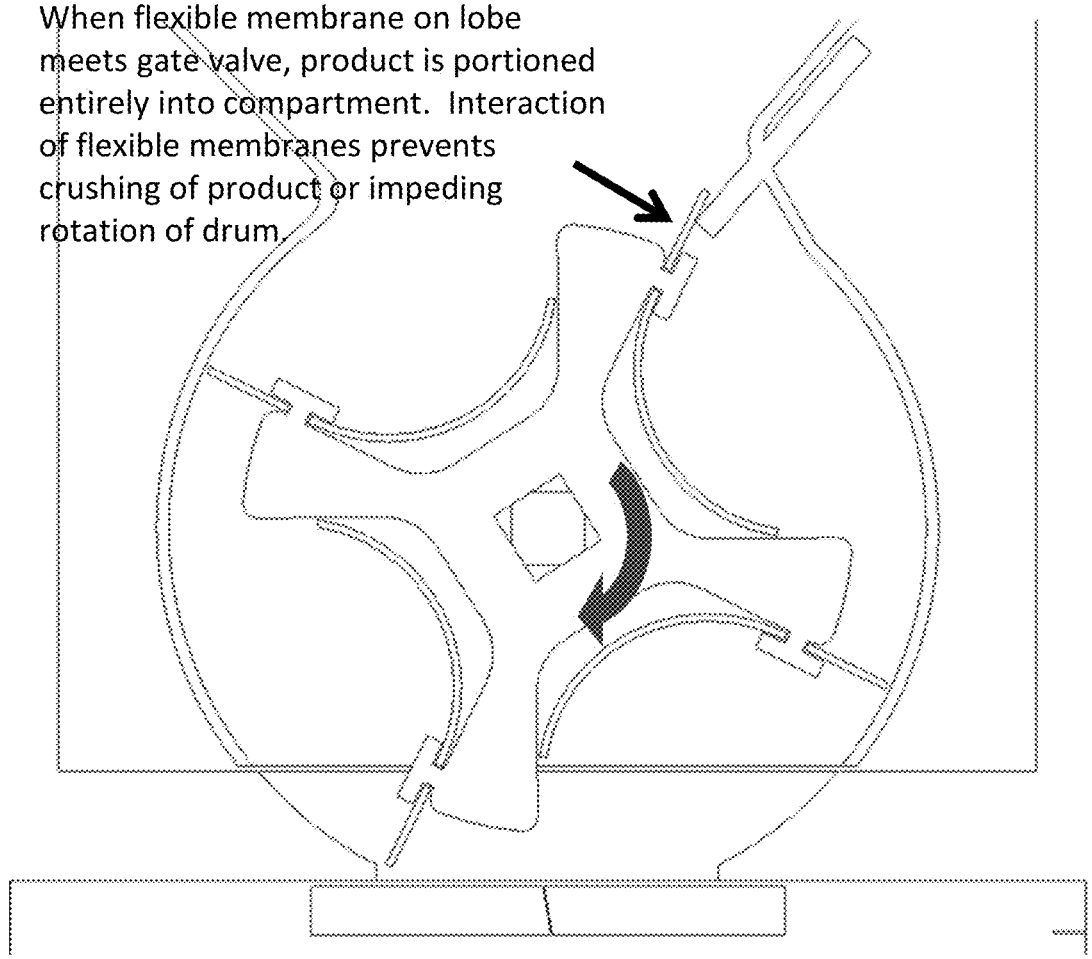
Figure 9:
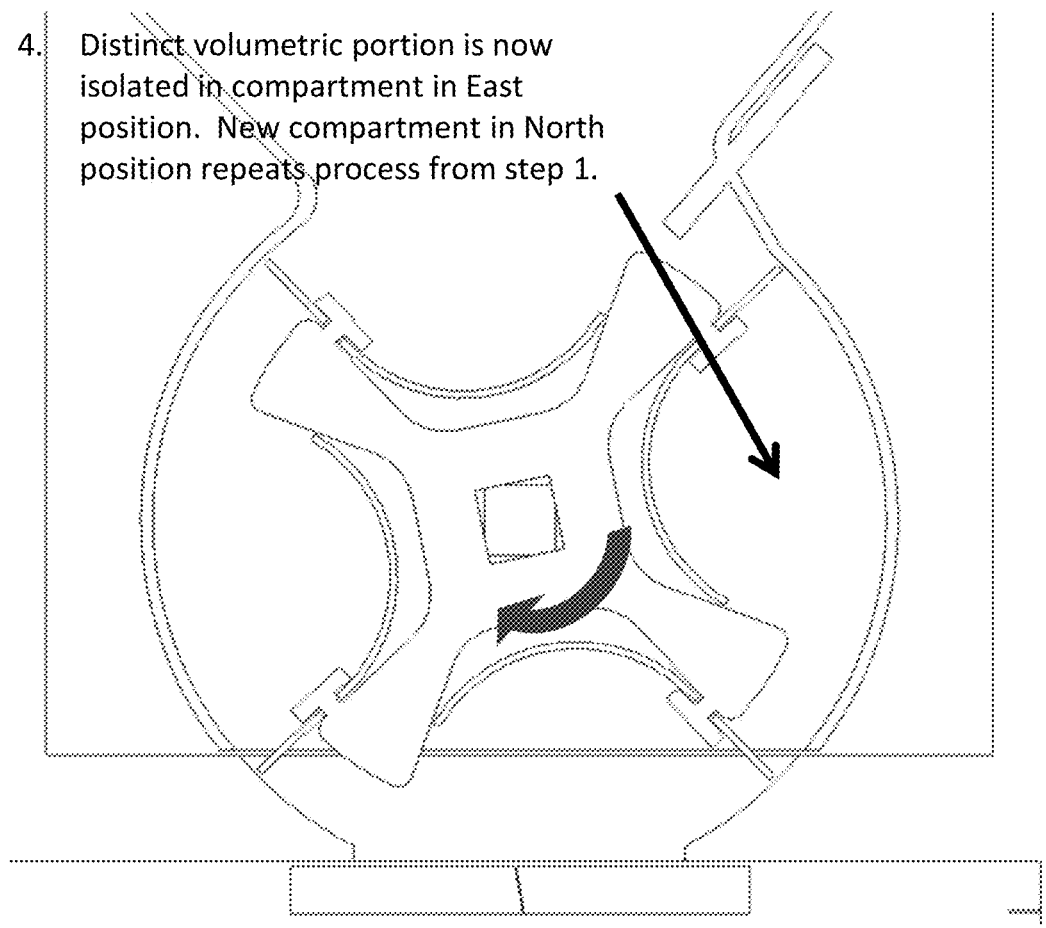

FIG. 5 shows a cutaway view of the rotating drum 144 with a plurality of lobes 150 defining product-transporting compartments or spaces 152 therebetween. The drum rotates within a drum chamber 170 to carry bulk product from the hopper to a dispensing point or receptacle (e.g., container or belt). While there are four lobes and four compartments shown in the figure, a greater or lesser number of lobes and compartments may be configured. The lobes are shown as evenly spaced with compartments of substantially the same size and volume, although spacing of lobes may be varied.

As seen in FIGS. 6-11, the compartments formed between adjacent lobes carry bulk product from the hopper to a dispensing point or receptacle (e.g., container) by rotation of the drum. The rotation can be driven by a motor, hand-cranking, or similar mechanical action. Rotation can be triggered by manipulation of a control, or as described below, by pushing a container into place below the dispensing point.

The unique drum design of the present invention eliminates rigid pinch points for the bulk product as the drum rotates, and allows for expansion of the functional volume of the compartment to eliminate compression or crushing of the bulk product. In a preferred embodiment, the lobes 150 do not extend all the way to the interior walls of the drum chamber 170 (i.e., the maximum diameter of the drum lobes is smaller than the inside diameter of the drum chamber). Each compartment includes a flexible or elastic (or both) membrane 160 that extends between (and beyond, in some cases) the sides or ends of the respective lobes. As seen in the figures, at least one end (in some embodiments, both ends) of the membrane extends beyond the end of a respective lobe to contact or touch the interior wall of the drum chamber.

In some embodiments, the membrane may be fixedly attached at or near each end to the side or end of the respective lobe. The membrane may be slidingly or floatingly attached (such as by a bracket or holder) at or near each end to the side or end of the respective lobe. Combinations of fixed attachment and sliding/floating attachment may be used. For example, the leading end 162 (with respect to clockwise rotation of the drum in the view shown) of the membranes shown in FIG. 5 are floatingly/sliding attached to the trailing side of the respective leading lobe, and the trailing end 164 is fixedly attached by brackets 156 to the corresponding side or end of the respective trailing lobe. The brackets 156 hold the sides of the membrane proximate to (or between the midpoint of the membrane and) the trailing end 164 of the membrane. The trailing end 164 of the membrane extends to the interior walls of the drum chamber, and keeps bulk product from moving from the compartment during rotation of the drum. The leading end of the membrane also may extend to the interior wall of the drum chamber, keeping bulk product from moving or falling into the preceding compartment.

The end or ends of the membrane 160 interact during drum rotation with one or more flexible gate valves 146 which may be attached or extend from the deflector or deflectors 142. The gate valve or valves 146 may be comprised of similar flexible and/or elastic material as the compartment membranes 160. The interaction allows portions of bulk product to be separated into respective compartments while avoiding a rigid or semi-rigid "pinch point" between lobes of the drum and the bottom of the deflector or gate valve.

The membranes 160 also are designed to allow the compartment space to expand and contract. As seen in FIGS. 6-9, bulk product freely fills a compartment in the "north" or "top" or "load" position. As the drum rotates, the compartment effectively becomes closed (in the "east" position). As the trailing end of the membrane meets the gate valve, the bulk product is portioned entirely into the compartment. To prevent the bulk product from being crushed or compressed as the drum rotates, the membrane expands towards the center of the drum, thereby allowing more effective volume for the bulk product. In addition, as discussed above, the interaction of the flexible membrane and gate valve prevents crushing of the product or impeding or interfering with the drum rotation.

Figure 10:
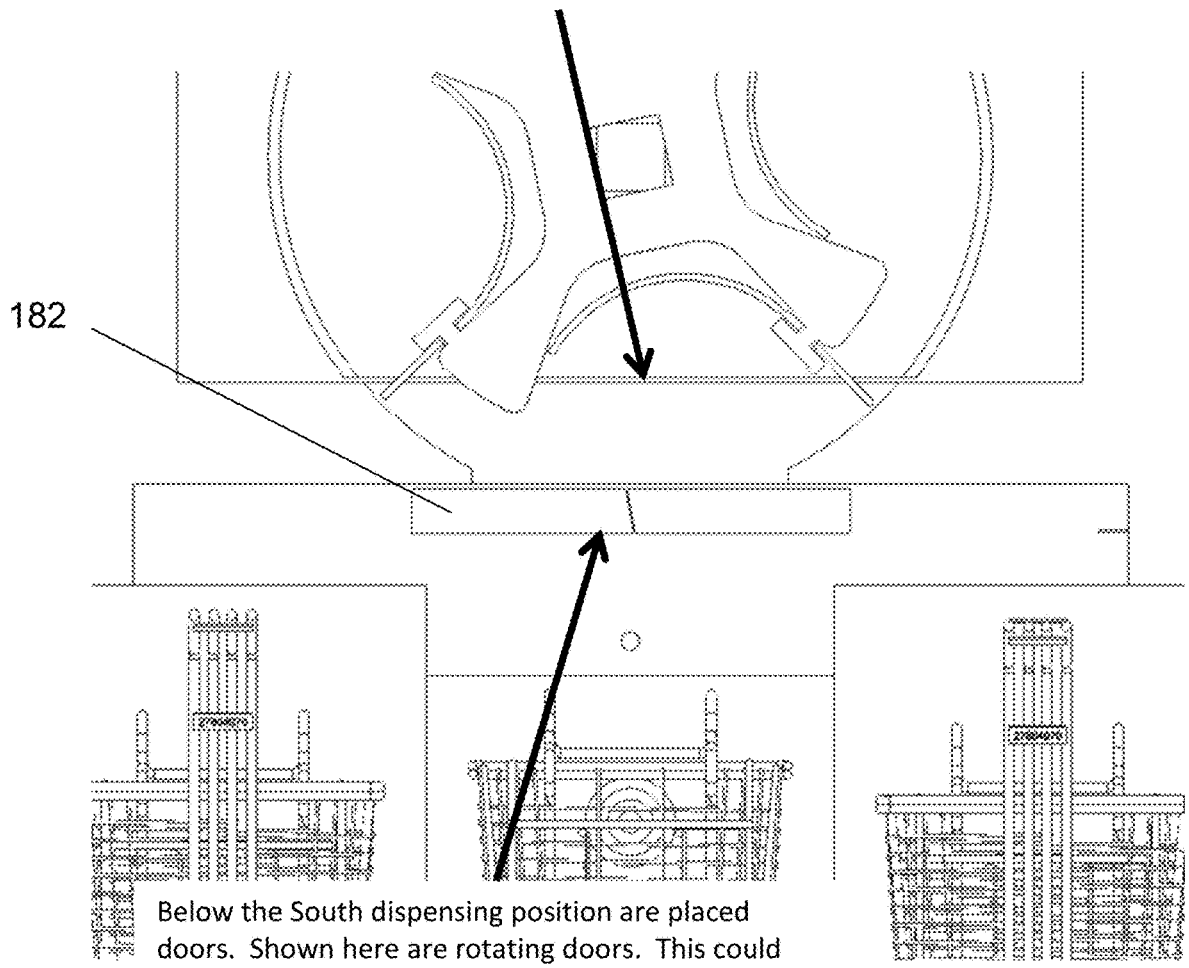
Figure 11:
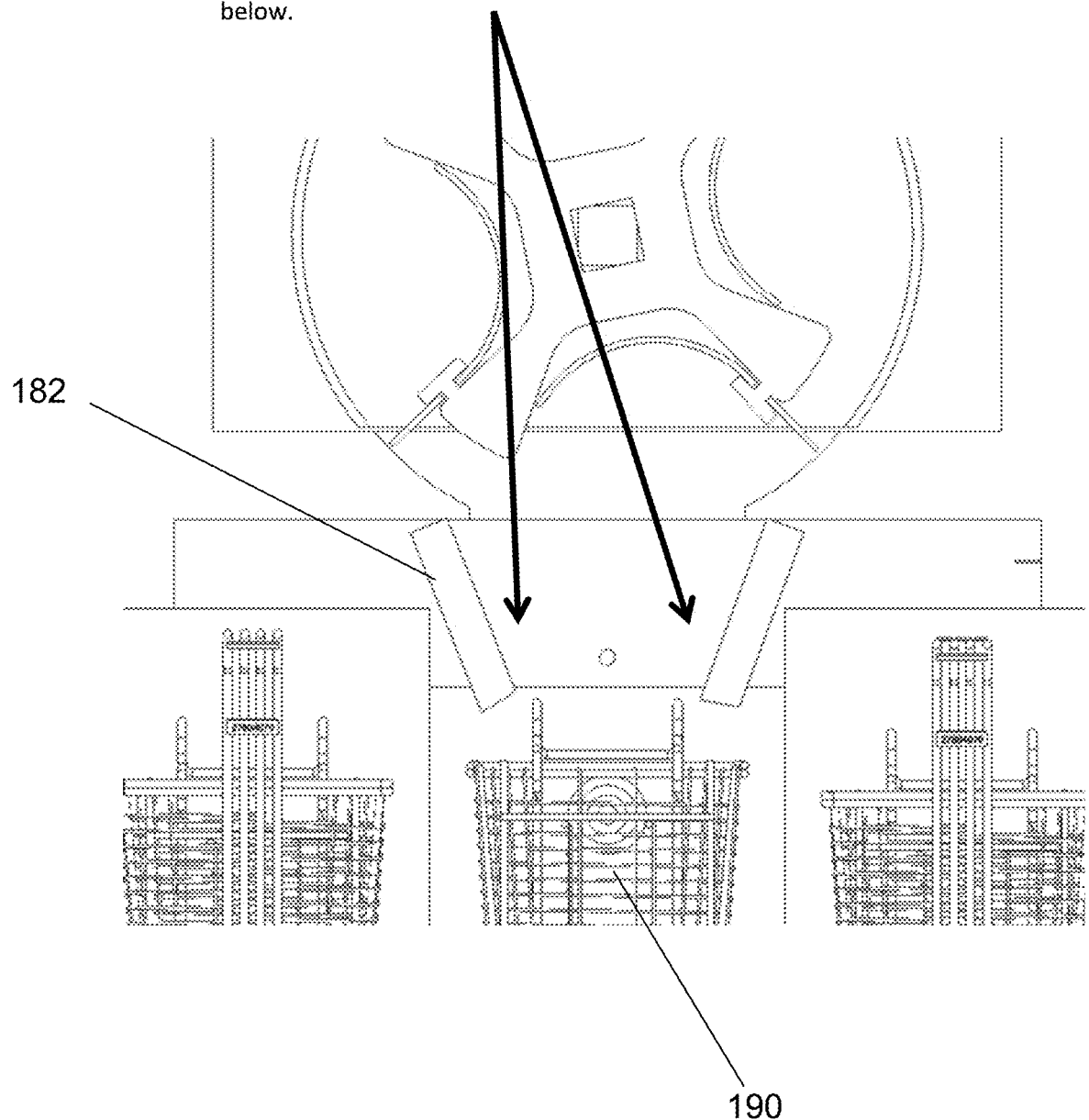

As seen in FIGS. 10 and 11, when the compartment reaches the "south" or "bottom" or "dispense" position, it is ready to dispense the contained portion of bulk product into a container 190 or belt positioned below the compartment. Doors 182 can be provided to hold the bulk product in the compartment until receiving a signal to dispense, thereby opening the doors and allowing the bulk product to freely fall into the container or belt. The door or doors can be rotating or hinged, or open by sliding. In one embodiment, there are no doors, and the process of rotating to the South position allows the bulk product to fall below.

Figure 12:
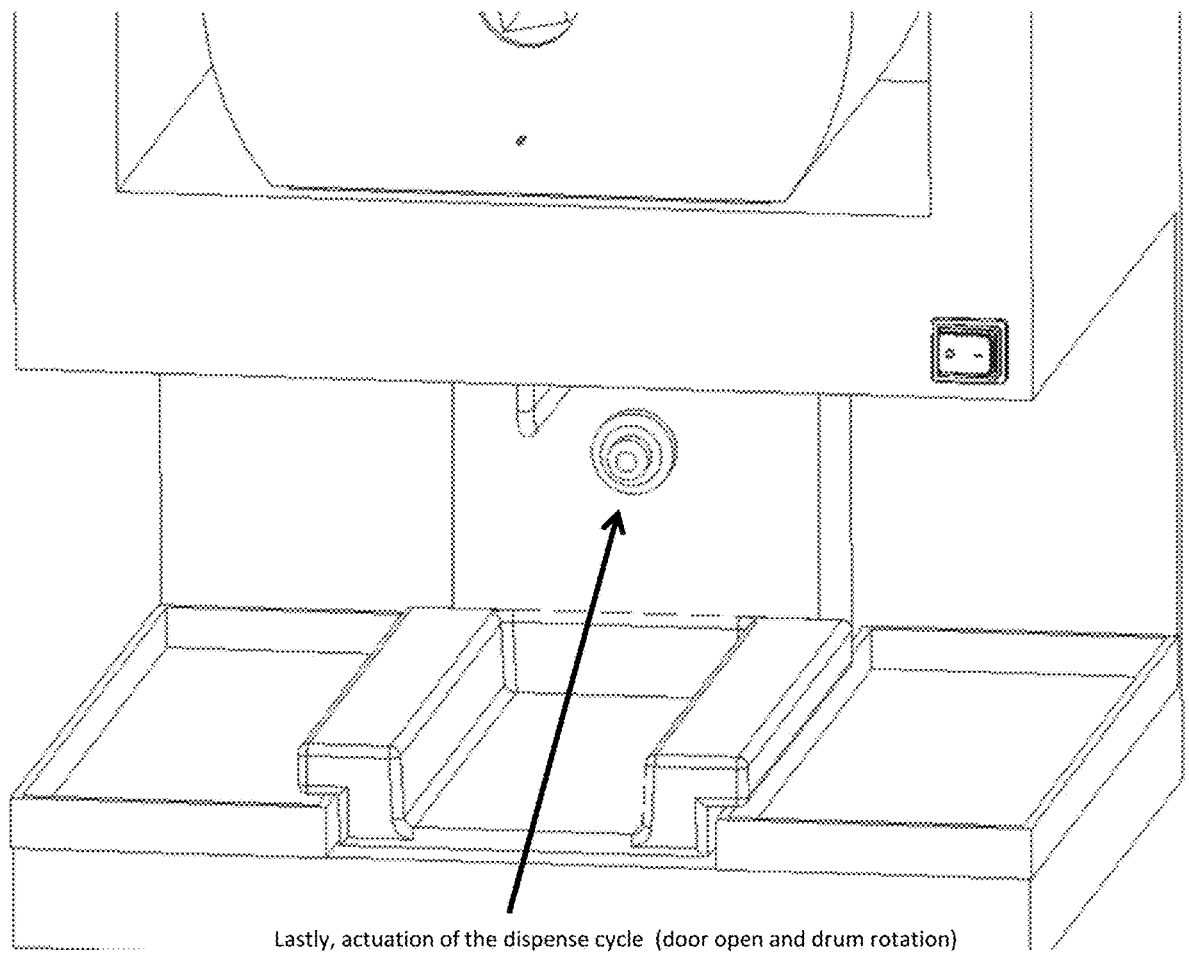
FIG. 12 shows a perspective view of the dispense area of the improved dispensing unit of FIG. 2.

Actuation or activation of the dispense cycle (e.g., drum rotation, belt movement, door opening) can be initiated by a number of means, including, but not limited, use of the control panel, a manual push button, input from a computer system or computing device, or by insertion of a container into the proper dispensing slot, thereby activating a button (as seen in FIG. 12) or a sensor.

Figure 13:
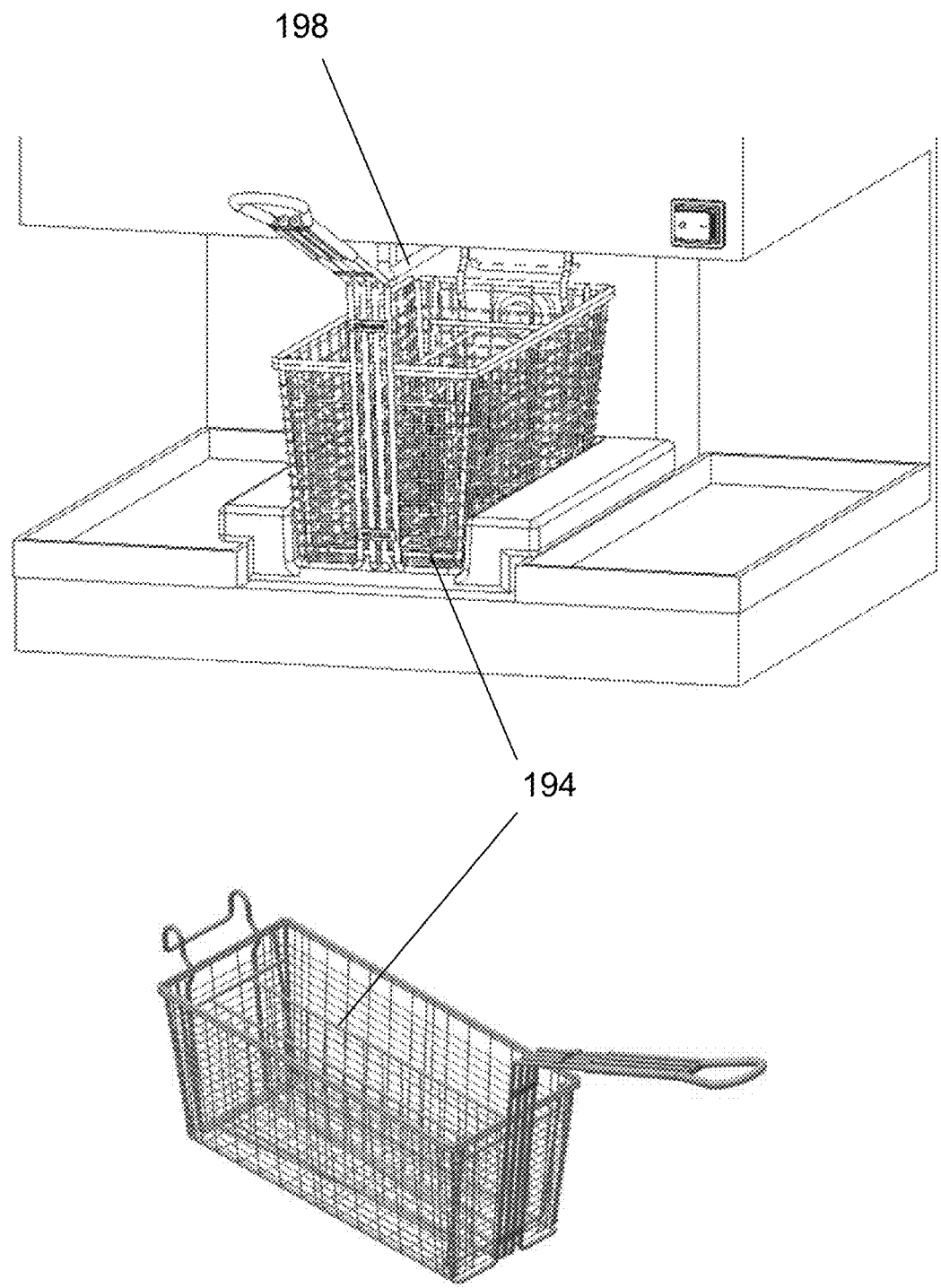
FIGS. 13-15 show views of a dividing rod and divided container.
Figure 14:
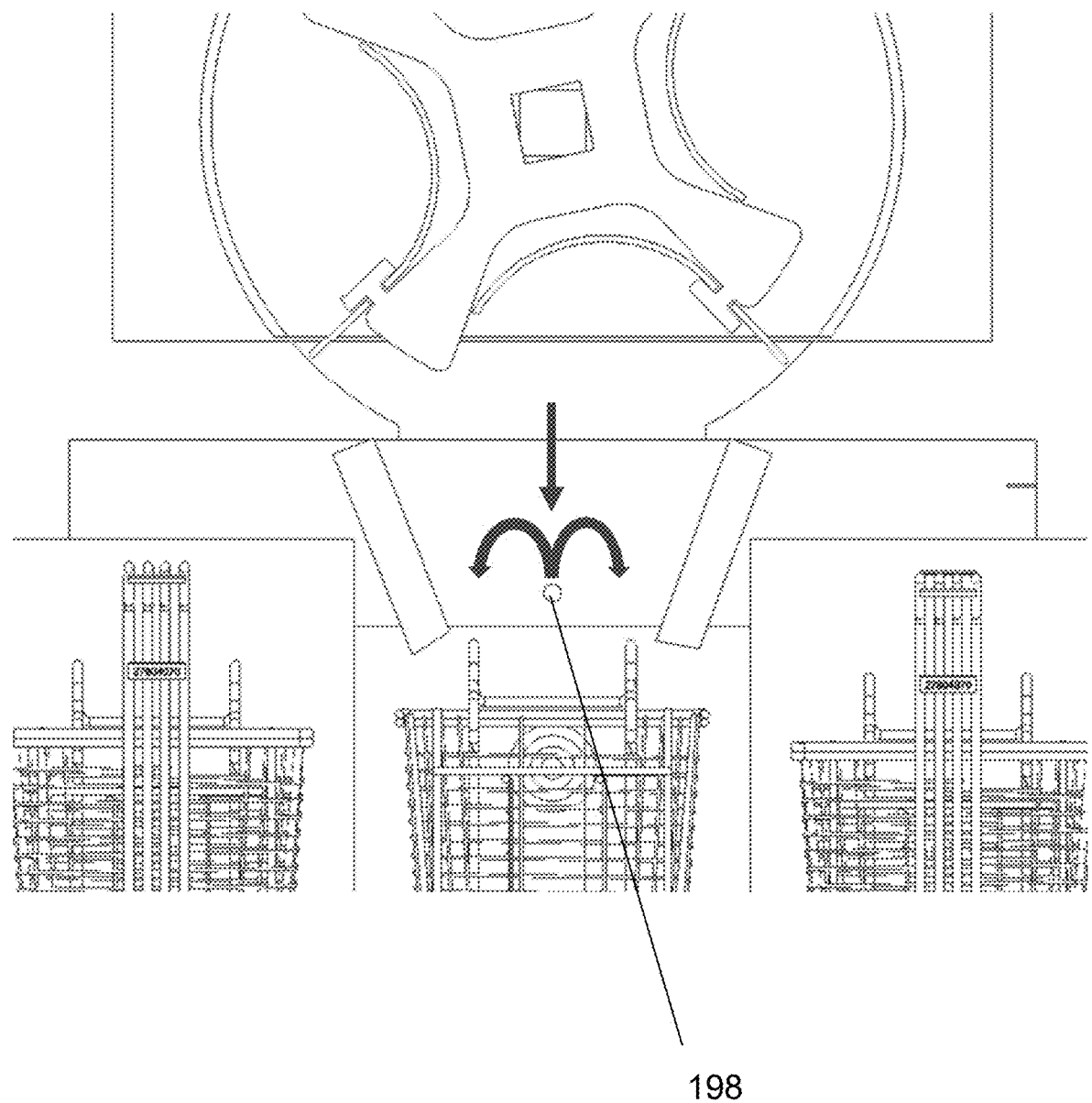
Figure 15:
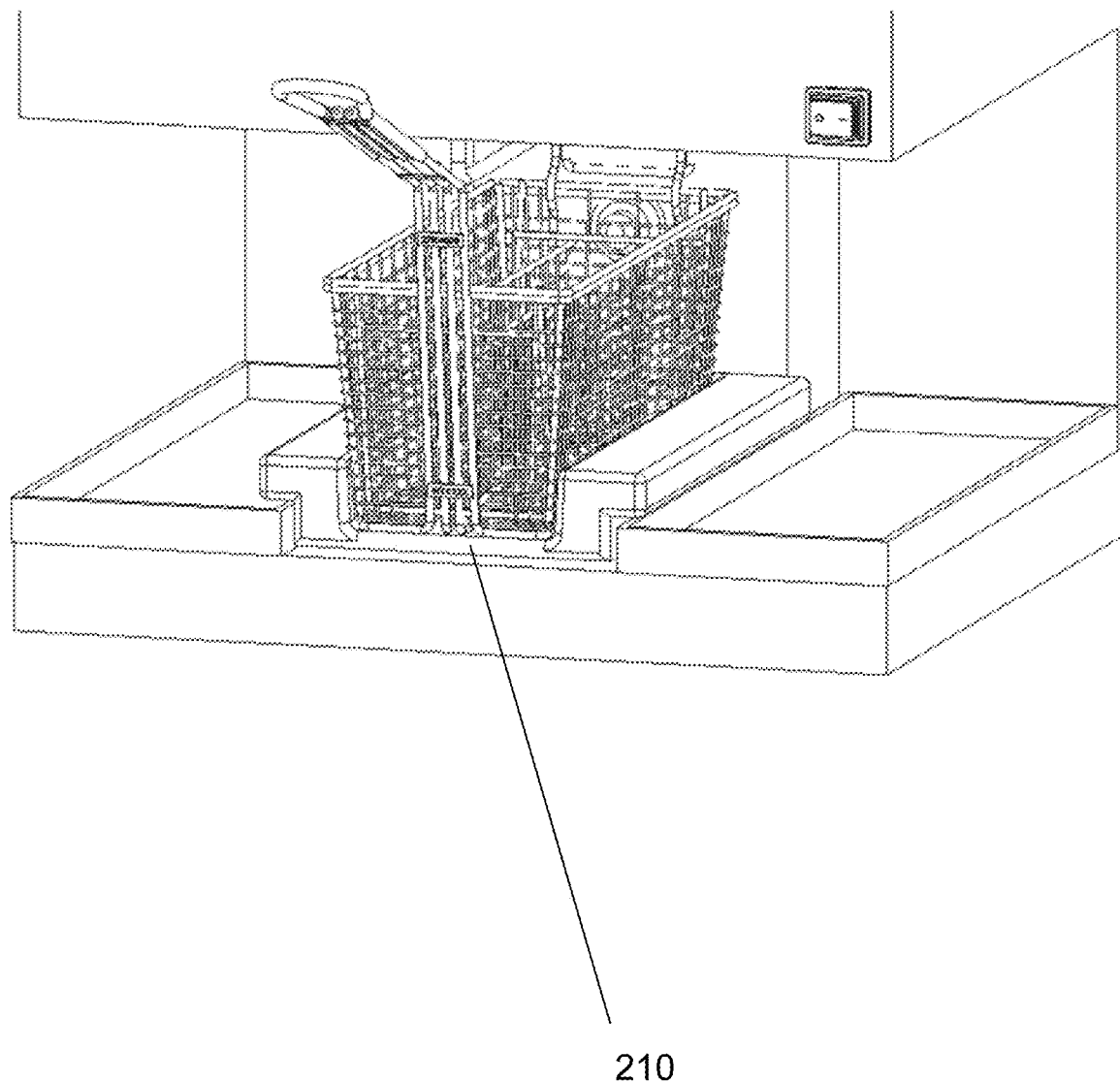

In some cases, it is preferred to have a divided container 194 to keep the product separated to prevent sticking and improved cooking. While a divided container can be used with the apparatus as described above, in several embodiments a dividing element, which can be in the form of a circular, angled, or triangular rod, or other form of divider 198 is placed below the "dispense" position of the drum, as seen in FIGS. 13-15. The dividing rod 198 is positioned with its longitudinal axis aligned with the longitudinal axis of the container or container, and acts to divide the falling product into right and left streams. This more evenly distributes the falling product into the divided parts of the container, and prevents the product from piling up in the middle. It should be noted that containers can be divided into multiple sections, and more than one dividing rod or similar element can be used to ensure proper apportionment of the bulk product. A divided container apparatus may be used for cooking, holding or serving product.

With some products, especially with divided containers, even with the placement of the dividing rod 198 to split the falling product stream, it is possible to have some of the product accumulate or "pile up" on top of the container dividers. Accordingly, in some embodiments, the container may be subject to a vibration or oscillating movement to cause the container to vibrate or oscillate to cause the product to fall into the spaces between the dividers and allow the product to settle. The vibration or oscillation feature can be achieved by a variety of means. In the embodiment shown in FIG. 15, the platform on which the container sits in the dispensing position vibrates or oscillates 210. Vibration may also be achieved from rotation or the drum from above, or other means. The vibration or oscillation may be separately operating (i.e., turned off or on independently), may operate automatically when the bulk product is dispensed, or combinations thereof.

The present invention is advantageous and may be utilized in any commercial or institutional food service facility such as restaurants, universities, hospitals, catering/banquet/convention halls, and the like. Additionally, the invention provides advantages of automatically portioning a predetermined amount of bulk food efficiently and accurately in a time effective manner. In particular, the present invention improves the quality and yield of the bulk food item, increases speed, as well as allows for flexibility in the design of the dispenser unit. Additionally, the simple operation, and ergonomic controls, as well as the removable parts, provide other advantages. These and other advantages will be recognized by the user.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An improved bulk product dispenser unit, comprising:
   a cabinet comprising a hopper having a drum chamber with an inner wall, a drum positioned inside the drum chamber, a deflector and a flexible gate valve; and
   a dispense assembly;
   wherein the drum comprises a plurality of product compartments, at least one product compartment comprising a flexible and/or elastic membrane, wherein the membrane comprises a first end and a second end, further wherein the membrane proximate the first end is slidingly attached to a first interior side of the at least one product compartment, and the second end is fixedly attached to a second interior side of the at least one product compartment.

2. The dispenser unit of claim 1, wherein the dispenser unit is a freezer box with a self-contained refrigeration system.

3. The dispenser unit of claim 1, wherein the flexible gate valve is located opposite to and below the deflector and is located at a downward angle from a sidewall of the one hopper with at least a portion in contact with a portion of the drum when the drum is in a stationary position.

4. The dispenser unit of claim 1, further comprising a control system.

5. The dispenser unit of claim 1, wherein the first end extends to the inner wall of the drum chamber.

6. The dispenser unit of claim 5, wherein the membrane is configured to expand and retract with movement of the drum.

7. The dispenser unit of claim 6, wherein the expansion of the membranes increases the effective product-containing volume within the product compartment.

8. The dispenser unit of claim 1, wherein, when a product is received in the hopper, the deflector deflects the product to a top portion of the drum.

9. The dispenser unit of claim 8, wherein the product rests on a contact area between the top portion of the drum and the flexible gate valve.

10. The dispenser unit of claim 9, wherein the drum rotates in a single direction to transport the bulk frozen food items from the contact area of the drum past the flexible gate valve towards a bottom portion of the hopper.

11. The dispenser unit of claim 10, wherein the drum continues rotating until a predetermined weight on a load cell system is satisfied.

12. The dispenser unit of claim 1, wherein the dispense assembly further comprises at least one dispensing door assembly, and at least one receiving basket for collecting a dispensed product.

13. The dispenser unit of claim 12, further wherein the at least one receiving basket vibrates or oscillates when collecting the dispensed product.

14. The dispenser unit of claim 12, the dispense assembly further comprising a button or sensor, wherein product is delivered when a receiving basket is inserted into the dispensing assembly to activate the button or sensor.

15. The dispenser unit of claim 12, wherein the dispense assembly further comprises a load cell system and a proximity sensor, and stores the product delivered until the proximity sensor detects the at least one receiving basket and allows for the product to be dispensed therein.

16. The dispenser unit of claim 12, further comprising a product flow divider positioned above the receiving basket, said divider configured to cause the dispensed product to divide into two or more flow streams.

17. The dispenser unit of claim 16, wherein the divider is a dividing rod.

18. The dispenser unit of claim 16, wherein the divider is configured to divide the product into two evenly divided streams into a divided receiving basket.

* * * * *